Patented Mar. 6, 1951

2,544,483

UNITED STATES PATENT OFFICE 2,544,483

INORGANIC SPONGE BLOWING AGENTS

Arthur A. Baum, Wilmington, Del., assignor to E. I. du Pont de Nemours & Company, Wilmington, Del., a corporation of Delaware No Drawing. Application November 27, 1948, Serial No. 62,411

3 Claims. (Cl. 260—2.5)

This invention relates to the preparation of rubber sponge material, and more particularly to the preparation of stable dispersions of inorganic sponge blowing agents and their use in the manufacture of rubber-like sponge material.

Rubber and other elastomeric materials can be converted to sponge form by incorporating into the elastomeric mixture a sponge blowing agent prior to vulcanization. On heating to vulcanize the mixture, the sponge blowing agent gives off a gas to form the sponge. Many variations of this process are described in the literature in which, for example, the mixture may be partially vulcanized under high pressure to avoid the expansion of the gas, then expanded to a sponge, and finally vulcanized completely in the expanded state, or a mold may be used of such a size that the expanding mixture is blown and vulcanized in one step but under conditions such that the sponge is under pressure at the end of the vulcanization.

In general, two types of agents are used for blowing sponges. The inorganic type as exemplified by sodium bicarbonate, which is presently used, tends to give a sponge having large, uneven pores. Large amounts of the carbonate are needed, and, as a consequence, the resulting sponge contains amounts of electrolytes which in some cases is found to be undesirable. The organic type of sponge blowing agent, such as diazoamino benzene, is much more efficient on a weight basis and gives a sponge having fine, uniform pores. However, this type of blowing agent is considerably more expensive than the inorganic type.

It is therefore an object of this invention to prepare inorganic sponge blowing agents of an improved form. It is a further object of the invention to produce sodium or ammonium carbonates or bicarbonates as a dispersion in oils or waxes which are highly effective in blowing of elastomer sponge and which produce sponge of finer texture and greater uniformity than is ordinarily possible to obtain with the inorganic sponge blowing agents now available. A still further object of the invention is to provide a process for the manufacture of elastomeric material in sponge form of greatly improved physical characteristics in which inorganic sponge blowing agents are employed.

In the manufacture of elastomeric (such as rubber of synthetic rubber) sponge, the inorganic sponge blowing agents, ordinarily sodium or ammonium carbonates or bicarbonates, are employed in a dry powder form. The size of the small crystals or particles, even when these materials are finely powdered, is relatively large even though reduced to a point where 60% or 80% of the material will pass through a 100 mesh sieve. Even extremely fine powders, such as those reduced to where they will pass through a standard 200 mesh sieve, will have a weight average particle diameter of approximately 60 microns. Such material reacts relatively slowly during the sponge blowing operation, and produces coarse, uneven gas cells in the sponge and, as pointed out above, relatively large amounts of this material are required.

I have found that, when sodium or ammonium carbonates or bicarbonates are ground in oil in the presence of an oil soluble dispersing agent, stable dispersions in the hydrocarbon oil can be produced in which the weight average particle diameter of the carbonate or bicarbonate is below 10 microns. When this stable dispersion of the carbonate or bicarbonate in oil is employed as a sponge blowing agent, it operates more efficiently than the customary dry powder that is ordinarily used, and produces a sponge having much finer pores and of greater uniformity.

It has been found that the use of an oil soluble dispersing agent is necessary if the crystals of the carbonate or bicarbonate are to be broken down during the grinding in the hydrocarbon oil. The grinding should be carried out to a point whereby upon microscopic inspection it is found that not over 5% of the total weight of the particles of the carbonate or bicarbonate are more than 15 microns in their greatest dimension. Usually, it will be found that, when the material has been ground sufficiently long that the major portion has been reduced to a particle size of not greater than from 5 to 10 microns, there will be less than 1% of the material of a particle size larger than 15 microns in its greatest dimension. In general, during the grinding operation, particularly where it is carried out in a ball mill, a stable oil dispersion of the carbonate or bicarbonate is obtained when the weight average particle diameter of 15 microns or less is attained. By "weight average diameter," we refer to the sum of the products of the weight of the particles multipled by the diameter of the particles, divided by the total weight of the sample. When this degree of fineness is attained, however, it will be found upon microscopic examination that less than 5% of the total weight of the carbonate or bicarbonate will be in particles greater than 15 microns in their greatest dimension, and ordinarily the amount of particles of 15 microns will be much less than 5% of the total weight.

Any neutral liquid hydrocarbon, or solid hydrocarbon which is liquid under the conditions of grinding, may be employed in the preparation of these dispersions. It is preferable that the hydrocarbon employed should have a flash point above 80° F. and a melting point below 200° F.

The use of the solid or more viscous hydrocarbons offer the advantage that the resulting products have high storage stability, although their use presents some added difficulties in carrying out the grinding operation. For obvious reasons, the use of a very volatile hydrocarbon is not desirable.

Any type of mill may be employed which will reduce the particles to the small size desired. The usual ball mill is found to be entirely satisfactory.

In the grinding operation, a wide variety of oil soluble dispersing agents may be used to assist in grinding to a small particle size. In general, these agents should contain a hydrocarbon chain sufficiently long to impart oil solubility, and, in addition, a strongly polar group to impart surface active properties. The amount of this agent to be used depends upon the activity of the particular agent. The following examples illustrate that 1%, based on the oil phase, is adequate in all cases. With more effective agents, this amount may be reduced to at least 0.1% on the oil phase, and in many cases still lower.

The preferred amount of dispersing agent to be employed will be between 0.5% and 2%, based on the amount of oil employed, although larger amounts up to 10% or even more may be used. While any of the oil soluble dispersing agents may be used to disperse the carbonate or bicarbonate in the hydrocarbon medium, the use of lecithin, zinc naphthenate or sodium petroleum sulfonate give the best results. (See Ind. & Eng. Chem., vol. 40, page 890, May 1948.)

In general, it is found desirable to prepare the dispersions having a solids content of from 40% to 60%. By conducting the grinding operation stepwise, it is possible to increase the solids content to at least 70%. Since these blowing agents are effective in such small amounts, it is found that for practical purposes the 50% dispersion of the carbonate or bicarbonate in the hydrocarbon medium is satisfactory. There is no particular advantage in preparing a dispersion having low solids contents, since it merely adds to the amount of oil or solid hydrocarbon that must be incorporated in the elastomer.

The following examples are given to illustrate the invention. The parts used are by weight, unless otherwise specified.

*Example 1*

A mixture of 100 parts of sodium bicarbonate, 100 parts of white paraffin oil "Nujol" and 1 part of lecithin was ground in a ball mill containing flint balls for 8 days. The resulting product was a thin, white, oily suspension which showed no separation of oil upon standing for several days. A photomicrograph of the material showed it to have an average particle diameter of under 10 microns, and that less than 5% of the weight of the material was in particles which were more than 15 microns in their greatest dimension.

When a similar mixture of 100 parts of sodium bicarbonate and 100 parts of white paraffin oil "Nujol" was ground under identical conditions except no lecithin was present, the product obtained after 8 days' grinding was a pasty mass which showed oil separation after standing a few days. A photomicrograph of the material showed it to have a weight average diameter of at least 40 microns. Substantially all of the sodium bicarbonate in the mass consisted of particles larger than 30 microns in their greatest dimension.

*Example 2*

A mixture of 100 parts of sodium bicarbonate, 100 parts of mineral oil "Circo light process oil," and 2 parts of zinc naphthenate "Nuocide zinc 12" was milled with gravel( pea size) for 3 days. The product was a stable, light yellow dispersion. A photomicrograph of this dispersion showed only a few particles, if any, larger than 5 microns in their greatest dimension.

*Example 3*

In a ball mill half full of one-half inch steel balls, was placed a mixture of 100 parts of sodium bicarbonate, 100 parts of mineral oil "Circo light process oil," and 2 parts of lecithin. After rolling for 3 days, a smooth, stable dispersion having a weight average particle size under 10 microns was obtained. A photomicrograph of this product showed substantially all particles under 10 microns in their greatest dimension.

*Example 4*

A mixture of 100 parts of ammonium carbonate, 100 parts of mineral oil and 2 parts of lecithin was milled in the same manner as Example 2. The product was a stable dispersion containing particles having a weight average diameter under 10 microns. Only a few, if any, of the particles were larger than 5 microns in their greatest dimension.

*Example 5*

Mixtures of 100 parts of sodium carbonate and 100 parts of mineral oil "Circo light process oil" were made up with the following additives:

A—None, control
B—One part of lecithin
C—One part of zinc naphthenate
D—One part of sodium petroleum sulfonate.

These mixes were rolled in mills half full of gravel (pea size) for five days. At the conclusion, A was a thick paste containing coarse particles similar to those of the control sample of Example 1 (paragraph 2), while B, C and D were stable dispersions having average particle diameters below 10 microns. Only a few particles in each of these products were over 10 microns in their greatest dimension.

*Example 6*

Ammonium bicarbonate was ground as in Example 2 with an equal weight of mineral oil containing 0%, 1% and 2% of lecithin. After one week's grinding, the two samples containing 1% and 2% of lecithin, respectively, were thin, smooth dispersions, while the one containing no lecithin was a thick, coarse paste.

*Example 7*

Mixtures of 100 parts of sodium bicarbonate and 100 parts of mineral oil "Circo light process oil" were milled with gravel as in Example 2 with one part of the following additives:

Calcium petroleum sulfonate
Diamyl amine
Dioctyl phthalate
Glyceryl dioleate
Lauryl amine stearate
Lead naphthenate
Octadecyl nitrile
Oleic acid
Oleyl amine
Sodium dioctyl sulfosuccinate
Sodium petroleum sulfonate
Stearic acid
Tetradecane amide.

In each case, the product was a uniform dispersion containing particles having a weight average diameter below 10 microns. Less than 5% of the material was in particles over 15 microns in their greatest dimension.

Example 8

Sodium bicarbonate was milled as in Example 1 with an equal weight of mineral oil "Circo light process oil" containing 0.1%, 0.25%, 0.5%, 1.0%, 2.0% and 4.0% of zinc naphthenate. In each case, a stable dispersion was obtained with particles having a weight average diameter of less than 10 microns. Less than 5% by weight of the particles were over 10 microns in their greatest dimension.

Example 9

To a ball mill half full of flint balls was added 100 parts of sodium bicarbonate, 100 parts of petrolatum (liquid at from 47° to 50° C.) and one part of lecithin. The mill was rotated under infra-red light for 14 days. The lamps were adjusted to keep the charge molten. The product was a smooth, homogeneous paste containing particles having a weight average diameter of not more than 5 microns. There were substantially no particles in the mass over 10 microns in their greatest dimension.

Example 10

In a manner similar to Example 9, a mixture of 100 parts of sodium bicarbonate, 100 parts of paraffin wax (liquid at 55° C.) and 2 parts of lecithin was milled with gravel (pea size) under infra-red light. The product solidified on cooling. Microscopic examination of a solution of this material indicated a weight average particle diameter considerably under 10 microns. Only a few particles (less than 1% by weight) were over 5 microns in their greatest dimension.

Example 11

Sponge mixes of various elastomers were made up on a rubber mill. These contained, as blowing agents, ordinary sodium bicarbonate and a 50% dispersion of sodium bicarbonate in oil (made as in Example 3 except that 1 part of lecithin, instead of 2 parts, was used) having a weight average particle diameter substantially less than 10 microns. Very few, if any, particles in the dispersion were over 15 microns in their greatest dimension. These mixes were then vulcanized and blown in one operation in a mold having more than sufficient room for any expansion (a so-called "free blow"). The results of these tests are given in Table I.

the density and four times the volume increase obtained with 5 parts directly. In each case, the carbonate dispersed in oil according to the present invention gave sponge of fine even texture, while the sponge made by the prior art method of direct addition of carbonate was coarse and irregular. Similarly, the other carbonates of Examples 4, 5 and 6, etc., or the dispersions obtained as described in the other examples, give elastomer sponges having the fine, even texture illustrated in this example and show similar efficiency in operation.

To insure a uniform fine pore sponge, the inorganic blowing agents of this invention should have a weight average particle diameter not greater than 15 microns and not more than 5% of the total weight of the particles should be more than 15 microns in their greatest dimension. Where petrolatum or wax is used as the hydrocarbon medium, the 15 micron size has been found to be adequate. Where a liquid hydrocarbon medium is employed, it is usually desirable to have the weight average particle diameter not greater than 10 microns so as to insure stability of the dispersion over extended periods of time and under adverse conditions.

As illustrated by the examples, the use of the very finely dispersed carbonate or bicarbonate results in much greater efficiency and a more rapid rate of blow in the preparation of elastomer sponges. Since much smaller amounts of the sponge blowing agent are needed, the resulting sponge will contain less electrolyte, which in many cases is of importance.

I claim:

1. A sponge blowing agent comprising a hydrocarbon dispersion of a compound of the class consisting of ammonium carbonate, ammonium bicarbonate, sodium carbonate and sodium bicarbonate, and an oil soluble dispersing agent, said compound having an average particle diameter of not over 15 microns and less than 5% of such compound by weight being in particles larger than 15 microns in their greatest dimension, said hydrocarbon being one which has a melting point below 200° F. and a flash point over 80° F.

2. A sponge blowing agent comprising a hydrocarbon dispersion of a compound of the class consisting of ammonium carbonate, ammonium bicarbonate, sodium carbonate and sodium bicarbonate containing from 0.1% to 10%, based on the hydrocarbon, of lecithin, said compound having an average particle diameter of not over 15 microns and less than 5% of such compound by

TABLE I

| | | | | | | |
|---|---|---|---|---|---|---|
| Polychloroprene (GR-M) | 100.0 | 100.0 | | | | |
| Butadiene-styrene interpolymer (GR-S) | | | 100.0 | 100.0 | | |
| Rubber (Pale Crepe) | | | | | 100.0 | 100.0 |
| 36% xylyl mercaptan solution | | | | | 0.5 | 0.5 |
| 50% zinc xylyl mercaptide solution | | | 2.0 | 2.0 | | |
| Extra light calcined magnesia | 4.0 | 4.0 | | | | |
| Phenyl alpha naphthylamine | 2.0 | 2.0 | 1.0 | 1.0 | 1.0 | 1.0 |
| Zinc oxide | 5.0 | 5.0 | 5.0 | 5.0 | 5.0 | 5.0 |
| Stearic acid | | | 3.0 | 3.0 | 10.0 | 10.0 |
| Petrolatum | 3.0 | 3.0 | 3.0 | 3.0 | 3.0 | 3.0 |
| Sulfur | | | 3.0 | 3.0 | 3.5 | 3.5 |
| MFT carbon black | | | 50.0 | 50.0 | | |
| Whiting | | | | | 50.0 | 50.0 |
| Tetramethyl thiuram monosulfide | | | 0.5 | 0.5 | 0.19 | 0.19 |
| Salicylic acid | | | 1.0 | 1.0 | | |
| "Circo" light process oil | 15.0 | 15.0 | 20.0 | 20.0 | 10.0 | 10.0 |
| Sodium bicarbonate | 10.0 | | 5.0 | | 10.0 | |
| 50% sodium bicarbonate dispersion in oil | | 4.0 | | 5.0 | | 4.0 |
| Cure: 30 minutes at 307° F. | | | | | | |
| Density of sponge, g./cc. | 0.223 | 0.210 | 0.714 | 0.353 | 0.347 | 0.291 |
| Volume increase on blowing, per cent | 492 | 474 | 57 | 218 | 240 | 307 |

It will be noted that only 2 parts of bicarbonate ground in oil gave the same or better blowing (lower density, greater volume increase) than 10 parts of the carbonate put directly into the rubber, and that 2.5 parts ground in oil gave half weight being in particles larger than 15 microns in their greatest dimension, said hydrocarbon being one which has a melting point below 200° F. and a flash point over 80° F.

3. In the process of producing sponge-like material from elastomers of the class consisting of natural rubber and synthetic rubber-like materials in which an inorganic sponge blowing agent is employed, the steps which comprise incorporating into the elastomeric material a hydrocarbon dispersion of a compound of the class consisting of ammonium carbonate, ammonium bicarbonate, sodium carbonate and sodium bicarbonate, which compound has an average particle diameter of not over 15 microns and less than 5% of such compound by weight being in particles larger than 15 microns in their greatest dimension, and vulcanizing the resulting mixture, said hydrocarbon being one which has a melting point below 200° F. and a flash point over 80° F.

ARTHUR A. BAUM.

REFERENCES CITED

The following references are of record in the file of this patent:

UNITED STATES PATENTS

| Number | Name | Date |
|---|---|---|
| 1,602,624 | North | Oct. 12, 1926 |
| 1,912,591 | Olin | June 6, 1933 |
| 2,079,051 | Sullivan et al. | May 4, 1937 |
| 2,201,064 | Thurman | May 14, 1940 |
| 2,209,451 | Geyer | July 30, 1940 |
| 2,299,593 | Roberts et al. | Oct. 20, 1942 |
| 2,466,027 | Horney et al. | Apr. 5, 1949 |

FOREIGN PATENTS

| Number | Country | Date |
|---|---|---|
| 464,174 | Great Britain | Apr. 13, 1937 |

OTHER REFERENCES

Du Pont Sponge Rubber Compounding, pp. 1–5, Report No. 38–6, June 1938, pub. by Du Pont Rubber Chem. Div.

Kholmov article abstracted in Chem. Abstr. 1946 40, 2671.

Circular No. 495, pp. 376–387, issued November 1935, by Scientific Sec. Nat'l Paint, Var., and Lac. Assn.